(No Model.)
J. J. JOHNSTON, Dec'd.
A. S. H. JOHNSTON & J. G. THOMPSON, Administrators, & A. JOHNSTON, Administratrix.
MEANS FOR UTILIZING HEAT OF LAMPS.
No. 479,368. Patented July 19, 1892.
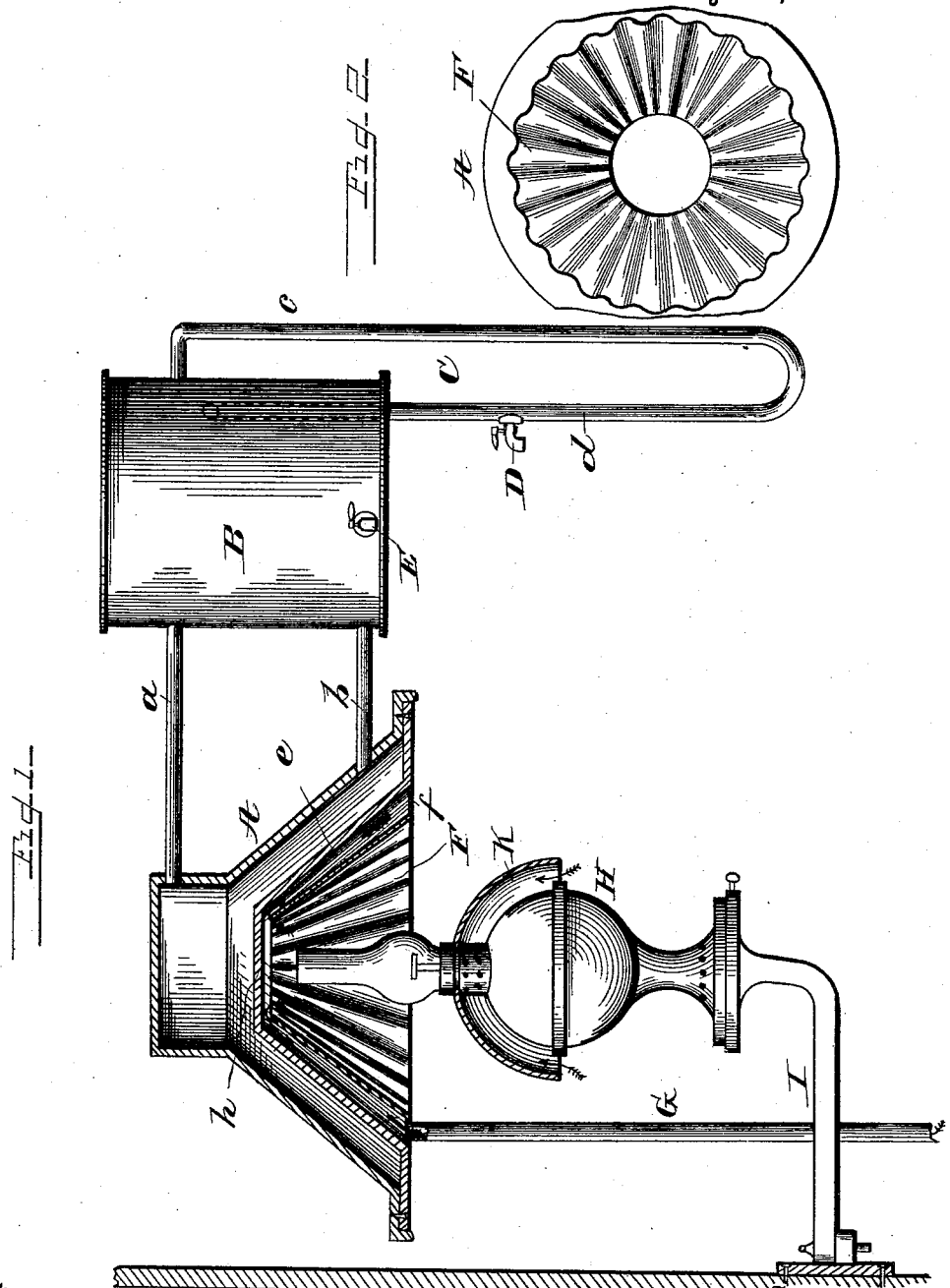

UNITED STATES PATENT OFFICE.

ALEXANDER S. H. JOHNSTON AND ANNA JOHNSTON, OF COLUMBIANA, OHIO, AND JAMES G. THOMPSON, OF NEW BRIGHTON, PENNSYLVANIA, ADMINISTRATORS OF JAMES J. JOHNSTON, DECEASED, ASSIGNORS OF ONE-HALF TO DAVID C. REINOHL, OF WASHINGTON, DISTRICT OF COLUMBIA; JOHN E. ALLEN, PRESENT ADMINISTRATOR, SUCCEEDING PRIOR ADMINISTRATORS.

MEANS FOR UTILIZING HEAT OF LAMPS.

SPECIFICATION forming part of Letters Patent No. 479,368, dated July 19, 1892.

Application filed October 1, 1891. Serial No. 407,450. (No model.)

*To all whom it may concern:*

Be it known that JAMES J. JOHNSTON, deceased, formerly a citizen of the United States, residing at Columbiana, in the county of Columbiana and State of Ohio, did in his lifetime invent certain new and useful Improvements in Means for Utilizing Heat of Lamps; and we, ALEXANDER S. H. JOHNSTON and JAMES G. THOMPSON, administrators, and ANNA JOHNSTON, administratrix, of said J. J. JOHNSTON, deceased, do hereby declare the following to be a full, clear, and exact description of the invention, such as will enable others skilled in the art to which it appertains to make and use the same.

This invention relates to means for utilizing the heat of lamps and other lighting devices, which is ordinarily allowed to pass off out of the chimney of the lamp and accumulate near the ceiling of a room or compartment, and has for its object a threefold purpose—namely, lighting and heating a room and heating water for toilet use.

The invention will be hereinafter described, and particularly pointed out in the claims.

In the accompanying drawings, which form part of this specification, Figure 1 represents a side elevation, partly in section; and Fig. 2, an inverted plan view of the water-heater and the reflector.

Reference being had to the drawings and the letters thereon, A indicates a water-heating chamber and B a reservoir, which are connected by pipes *a b* and supported in any suitable manner about four feet above the floor of a room. The reservoir B is provided with a water-circulating pipe C, one branch *c* of which communicates with the reservoir in about the same horizontal plane as the pipe *a*, and the opposite branch *d* of said pipe extends up into the reservoir above the bottom thereof. The branch *d* may be provided with a faucet D for drawing off water, and a faucet E may be applied directly to the reservoir for the same purpose.

F indicates a heat-reflector, preferably made of sheet metal—such as copper—and corrugated, as shown, and the under surface may be polished or nickel-plated to form a light-reflecting surface. The reflector is secured to the water-heater to form an air-heating chamber *e* between the outer surface of the lower plate of the water-heater and the reflector, with its lower end closed, as at *f*, and its upper end open.

To the air-heating chamber is attached a conduit G for conducting air from the floor of a room to said chamber, where it is heated and put into circulation.

Below the water-heating chamber is supported a suitable lighting and heating device, such as a lamp H, which rests upon a suitable bracket I. It is, however, obvious that the water-heating chamber may be placed over and above an ordinary wall gas-fixture for the same purpose.

The lamp may be provided with a shield K, such as we have claimed in our application, serial number 407,449 filed herewith, and also with the shade therein shown.

The heat from the chimney *g* of the lamp is directed against the lower central and horizontal portion *h* of the water-heating chamber, from which it is deflected, and a portion thereof enters the air-heating chamber *e*, where it mingles with the cold air supplied to said chamber by the conduit G, and the hottest air rises to the upper end of the chamber and passes off, coming in contact with the outer surface of the reflector in its dissipation into the room, whereby it takes up additional increments of heat from the reflector.

Having thus fully described this invention, what we claim is—

1. The combination, with a water-reservoir, of a water-heating chamber and suitable connections, an air-heating chamber under said water-heating chamber and a conduit for conducting air to said air-heating chamber, and a heating device under the water and air heating chamber.

2. The combination of a water-heating chamber, an air-heating chamber having one of its walls formed by one of the walls of the water-heating chamber, means for conducting air from or near the floor of a compartment to said air-heating chamber, and a heating device under both of said chambers.

3. The combination, with a reservoir, of a water-heating chamber provided with a deflecting-surface, a reflector, an air-heating chamber between the water-heater and the reflector, and a suitable heating device.

4. The combination, with a reservoir, of a water-heating chamber provided with a deflecting-surface, a reflector attached to the water-chamber, an air-heating chamber, a conduit for conducting air to said chamber, and a heating device.

In testimony whereof we affix our signatures in presence of two witnesses.

ALEXANDER S. H. JOHNSTON,
ANNA JOHNSTON,
JAS. G. THOMPSON,
*Administrators and Administratrix of the estate of James J. Johnston, deceased.*

Witnesses:
CHARLES STRICKLER,
JOHN G. AUGUSTINE.